May 9, 1950
R. G. BOYDSTUN
2,506,574
PLASTIC CYLINDER HEATER COIL
AND METHOD OF MAKING SAME
Filed Oct. 27, 1947
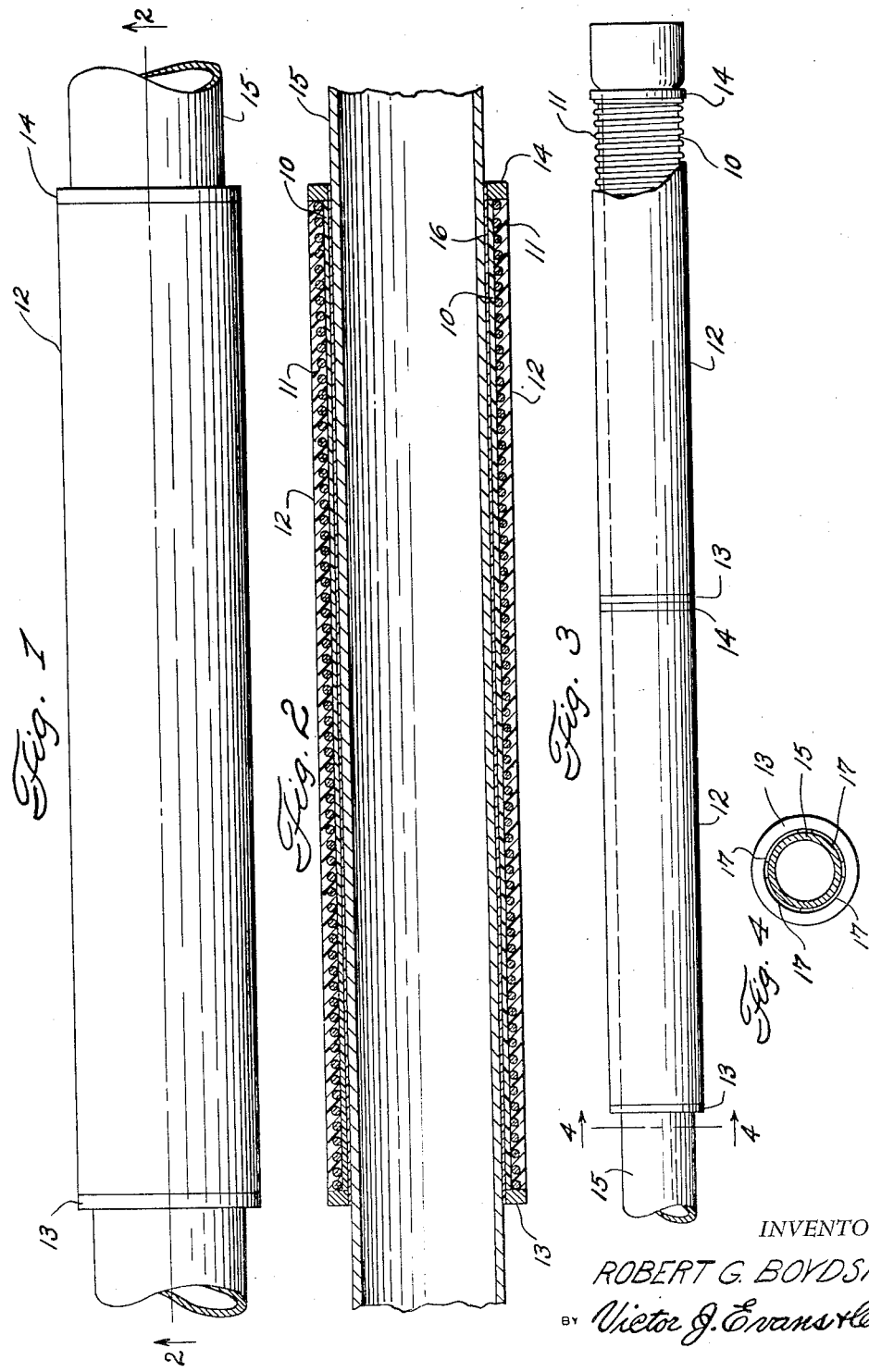
INVENTOR.
ROBERT G. BOYDSTUN
BY Victor J. Evans & Co.
ATTORNEYS Patented May 9, 1950

2,506,574

UNITED STATES PATENT OFFICE 2,506,574

PLASTIC CYLINDER HEATER COIL AND METHOD OF MAKING SAME

Robert G. Boydstun, Fort Worth, Tex.

Application October 27, 1947, Serial No. 782,319

2 Claims. (Cl. 219—39)

This invention relates to coil heaters for flow lines, pipes and tubing where it is desired to maintain temperatures above the temperature of the atmosphere in products passing therethrough, and in particular a cylindrical plastic heater coil and the method of making the same wherein a pipe is wrapped with paper, a coating of plastic material is placed around the paper and baked until it hardens, then a coil of wire is placed on the plastic, and another coating of plastic material is placed over the wire and baked. Metal rings may be cast into the plastic at the ends to form terminals.

The purpose of this invention is to provide a preformed thermogenic plastic element adapted to be placed around pipes, tubing, and the like to provide constant temperatures therein and eliminate winding of pipe and tube joints.

Various methods have been employed for applying heat to piping, tubing and the like, particularly by covering the pipe and joints thereof with asbestos and wrapping the asbestos with thermo-electric wire, but these form an integral part of the pipe and when it is desired to replace the pipe a new unit is required. With this thought in mind this invention contemplates preformed plastic units with copper or aluminum magnet wire coils therein that may readily be placed over and removed from the pipe or tube and particularly tubing with upset ends.

The object of the invention is to provide a method of making preformed thermogenic plastic cylinders that may readily be placed on and removed from pipe, tubing, and the like.

Another object of the invention is to provide a method of making plastic cylinder heater coils wherein the coils may be made for piping and tubes of different sizes.

Another object of the invention is to provide preformed plastic heater coils in which permanent contacts are provided around the ends.

Another object of the invention is to provide preformed plastic heater coils that may be placed end to end on pipe or tubing and in which the coils will make contact through the ends thereof.

A further object of the invention is to provide a method of making thermogenic plastic cylinders for use on pipe, tubing and the like in which the cylinders are of simple and economical construction.

With these and other objects and advantages in view the invention consists in the new and useful combination, construction, and arrangement of parts as more fully described herein, set forth in the claims appended hereto, and disclosed in the accompanying drawings forming part hereof, wherein:

Figure 1 is an elevational view showing a single cylindrical heater unit on a pipe.

Figure 2 is a longitudinal section through the unit taken on line 2—2 of Figure 1.

Figure 3 is a view illustrating a plurality of units on a tube with an upset end with the outer plastic coating of one of the units broken away.

Figure 4 is a cross section through a tube taken on line 4—4 of Figure 3 showing an end elevation of the heater unit and illustrating shims used between the unit and tube.

Referring now to the drawings wherein like reference characters indicate corresponding parts the plastic cylinder heating coil of this invention includes an inner plastic layer 10, a wire coil 11, and outer plastic layer 12, and rings 13 and 14 at the ends.

The units are formed by wrapping a pipe or tube 15 with brown paper 16, or the like, applying the inner layer 10 of plastic over the paper, baking the layer of plastic until hard, wrapping the layer of plastic with the wire coil 11, and then applying the outer plastic layer 12 and baking the outer layer until it hardens. The paper core may then be washed out. The ends of the wire coil may be connected to the rings 13 and 14 and the rings may be cast into the plastic.

The thermogenic plastic units are manufactured as illustrated in Figure 2 with the layer of paper between the inner plastic layer or cylinder and when the units are installed on a pipe or tube thin arcuate shims 17 may be inserted in the ends as shown in Figure 4 to space the inner surfaces of the units uniformly from the pipe or tube.

It will be understood that any suitable plastic may be used for the inner and outer layers although it is preferred to use Dow Chemical plastic or a similar material. It will also be understood that any suitable thermo-electric wire may be used and the wire may be of different sizes for different conditions.

The plastic cylinders have been described as formed of one coating or layer and it will be understood that both the inner and outer plastic layers may consist of a plurality of layers. The rings at the ends of the units form contacts when the units are positioned end to end and it will be understood that any suitable means may be provided for connecting the coils of the units.

It will also be understood that other changes may be made in the design and arrangement of parts without departing from the spirit of the invention.

What is claimed is:

1. In a cylindrical electric heater, the combination which comprises an inner cylindrical sleeve of insulating plastic material, a thermo-electric wire coil positioned around said sleeve, an outer insulating plastic sleeve covering and providing an enclosure for said wire coil and in which said coil is embedded, and annular contact rings positioned at the ends of said plastic sleeves and connected to the ends of said wire coil, said rings providing contact means for completing a circuit through the thermo-electric wire coil of the heater and positioned to contact corresponding rings of similar heaters with a plurality of said heaters removably mounted on a pipe or the like.

2. In a cylindrical electric heater, the combination which comprises an inner cylindrical sleeve of insulating plastic material, a thermo-electric wire coil positioned around said sleeve, an outer insulating plastic sleeve covering and providing an enclosure for said wire coil and in which said coil is embedded, annular contact rings positioned at the ends of said plastic sleeves and connected to the ends of said wire coil, said rings providing contact means for completing a circuit through the thermo-electric wire coil of the heater and positioned to contact corresponding rings of similar heaters with a plurality of said heaters removably mounted on a pipe or the like, and a thin removable sleeve providing a liner positioned within said inner plastic sleeve and extended through the contact rings at the ends thereof.

ROBERT G. BOYDSTUN.

REFERENCES CITED

The following references are of record in the file of this patent:

UNITED STATES PATENTS

| Number | Name | Date |
|---|---|---|
| 48,584 | Parry et al. | July 4, 1865 |
| 806,039 | Williamson et al. | Nov. 28, 1905 |
| 1,232,736 | Truman et al. | July 10, 1917 |
| 1,309,721 | Drinkern | July 15, 1919 |
| 1,375,084 | Cox | Apr. 19, 1921 |
| 1,718,106 | Bolsinger | June 18, 1929 |
| 1,767,586 | Hudson | June 24, 1930 |
| 2,211,380 | Mikkelson | Aug. 13, 1940 |